United States Patent

[11] 3,580,640

| [72] | Inventor | Birger Sture Erik Eriksson |
| | | Tranghalla, Sweden |
| [21] | Appl. No. | 808,179 |
| [22] | Filed | Mar. 18, 1969 |
| [45] | Patented | May 25, 1971 |
| [73] | Assignee | Aktiebolaget Jonkoping |
| | | Vulcan, Jonkoping, Sweden |
| [32] | Priority | Mar. 22, 1968 |
| [33] | | Sweden |
| [31] | | 3829/68 |

[54] SYSTEM FOR DISTRIBUTING AND ADVANCING OBJECTS
9 Claims, 12 Drawing Figs.

[52] U.S. Cl. ..................................................... 302/2R, 198/31AC, 302/31
[51] Int. Cl. ........................................................ B65g 47/26, B65g 51/02
[50] Field of Search .......................................... 198/31 A2, 31 A3, 31 R; 302/2, 25, 1, 29, 31; 193/43 D, 25

[56] References Cited
UNITED STATES PATENTS

| 1,505,830 | 8/1924 | Waters | 193/25(IE) |
| 2,744,601 | 5/1956 | Chilton | 193/25(IE) |
| 3,131,974 | 5/1964 | Futer | 302/31 |
| 3,180,688 | 4/1965 | Futer | 302/29 |
| 3,193,078 | 7/1965 | Amenta et al. | 198/31(A3) |
| 3,295,661 | 1/1967 | Mitchell et al. | 198/33(R1) |
| 3,477,764 | 11/1969 | Smith | 302/29 |
| 2,805,898 | 9/1957 | Willis | 302/29 |

*Primary Examiner*—Richard E. Aegerter
*Assistant Examiner*—W. Scott Carson
*Attorney*—Cushman, Darby and Cushman ABSTRACT: A system for distributing and advancing objects comprises a continuously pendulating, flexible distributing arm or chute with an inlet end into which said objects are fed sequentially at high velocity, and an outlet end which reciprocates transverse to a plurality of individual tracks which are separated from each other by separating means. The outlet end of the distributing arm is located on a higher level than that end of the separating means which is located nearest to the arm. The system further comprises means for compulsory advancing said objects along said arm and said tracks so that the objects passing the arm in a single row become uniformly distributed amongst said tracks.

INVENTOR
BIRGER STURE ERIK ERIKSSON

BY Cushman, Darby & Cushman
ATTORNEYS

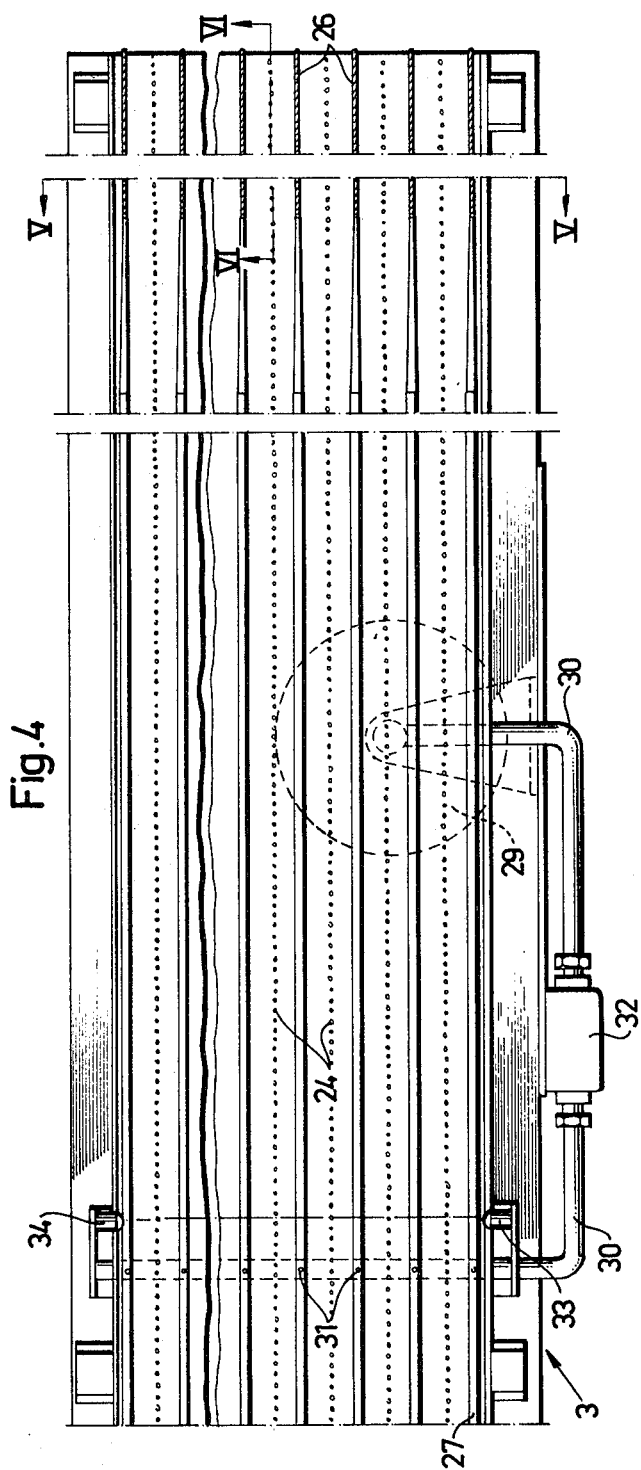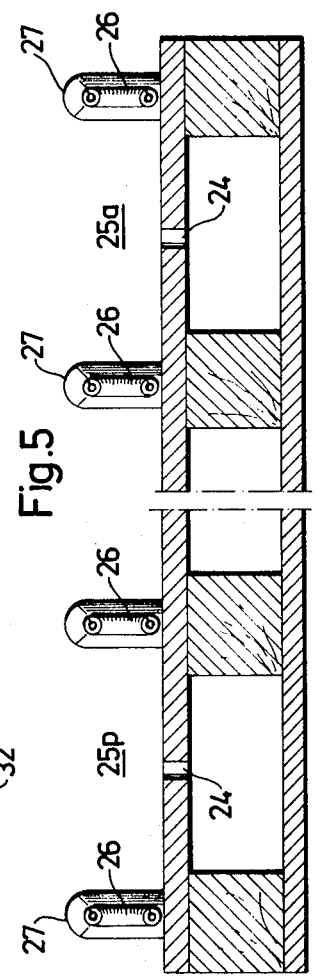

INVENTOR
BIRGER STURE ERIK ERIKSSON

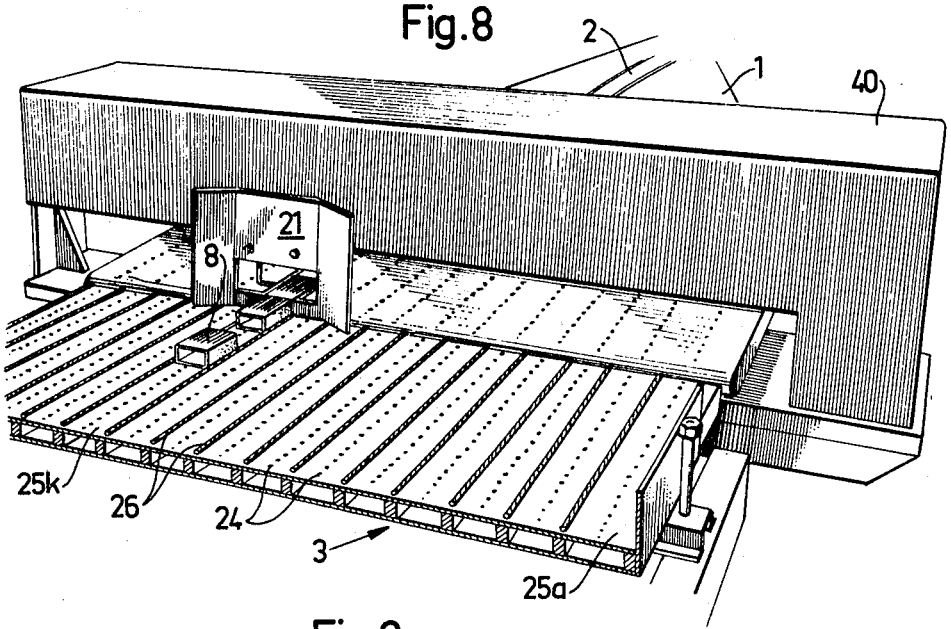
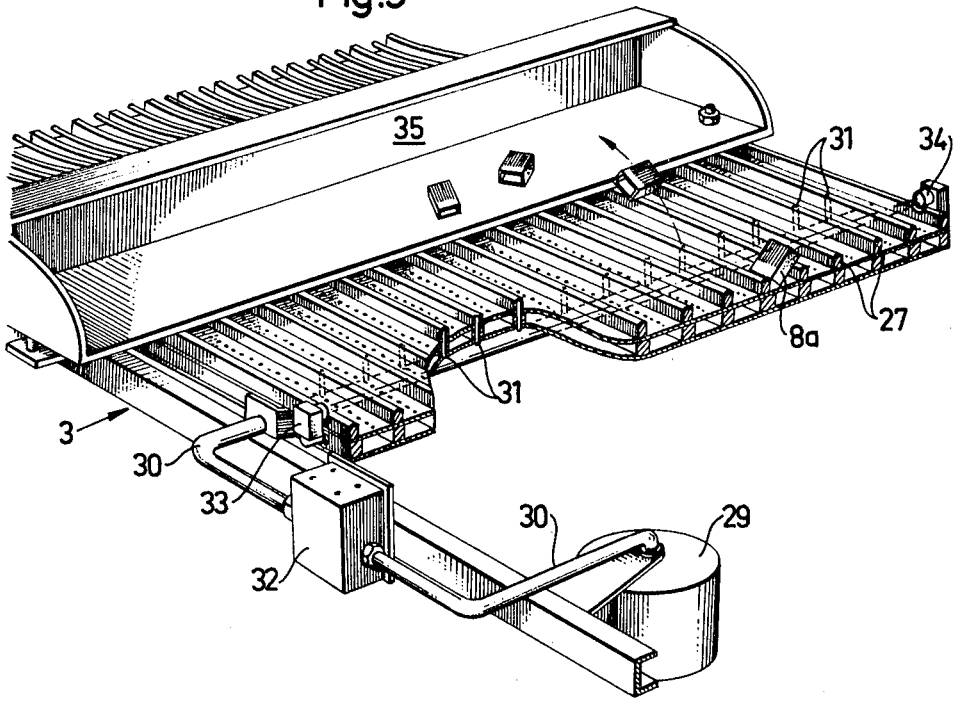

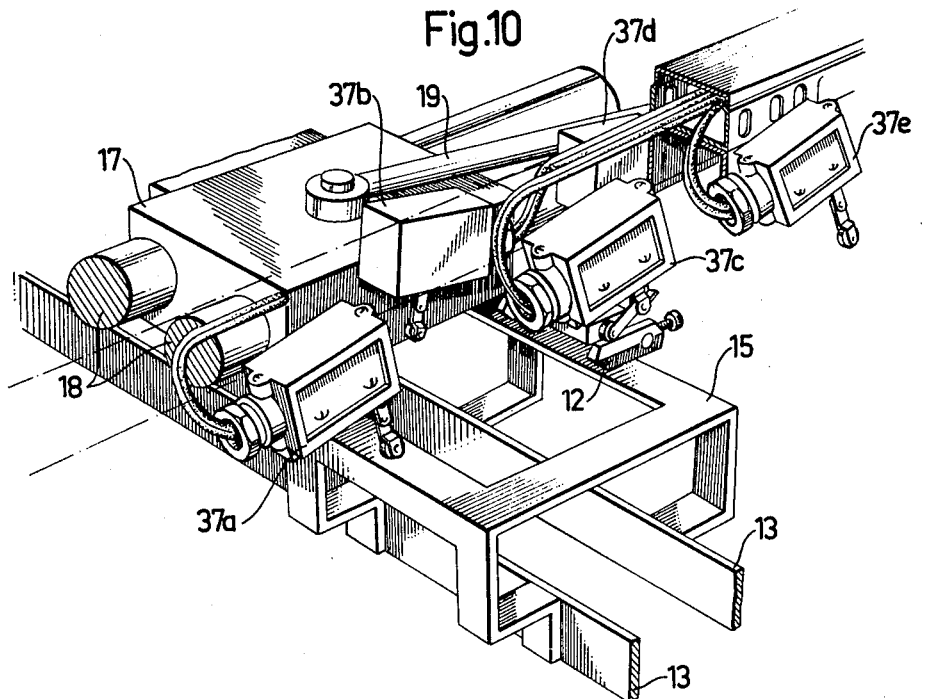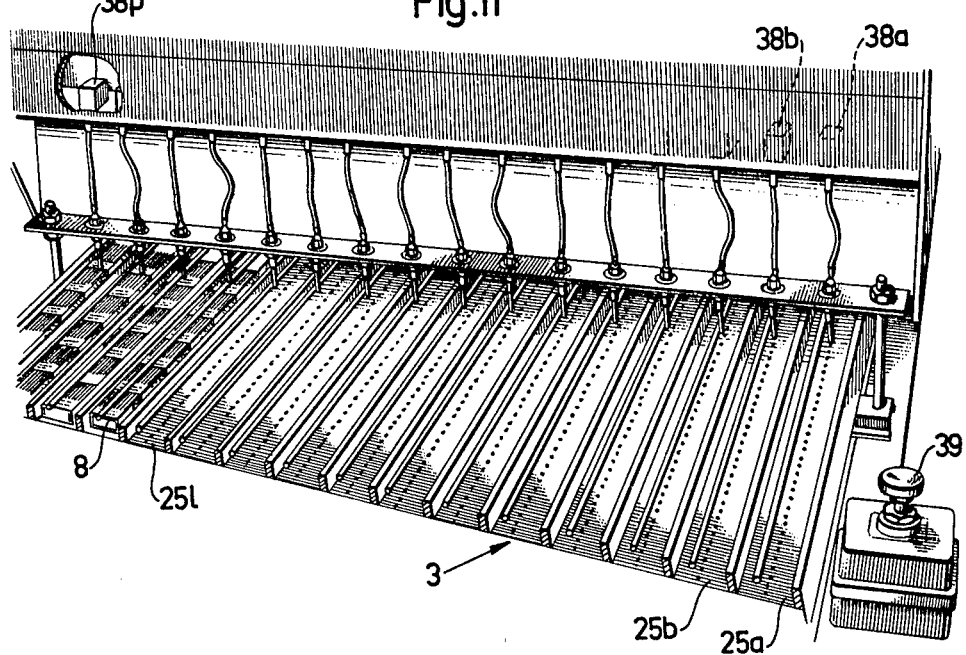

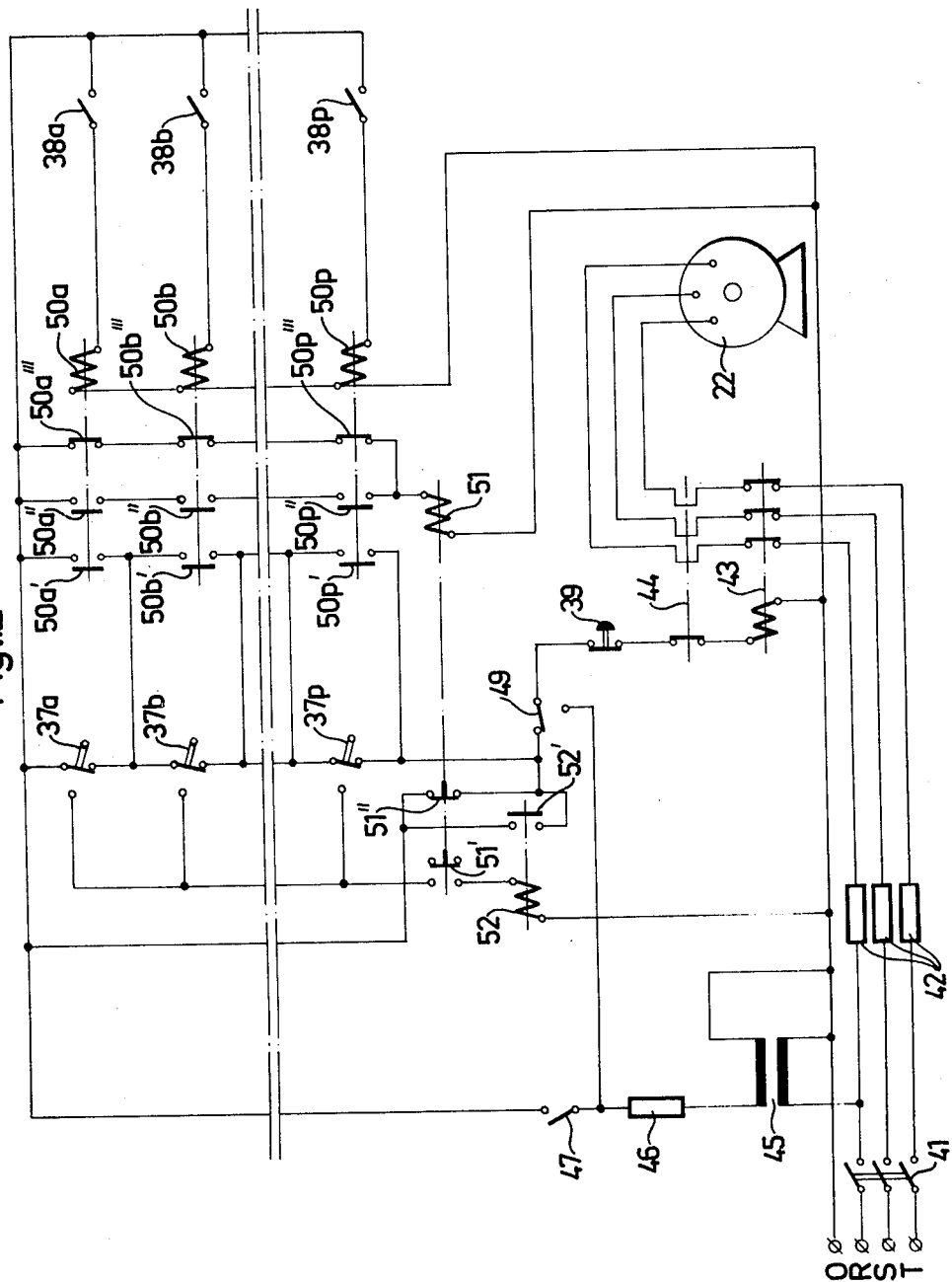

3,580,640

SYSTEM FOR DISTRIBUTING AND ADVANCING OBJECTS

This invention relates to a system or apparatus for distributing and advancing objects, which is connected e.g. to a machine for manufacturing and ejecting said objects and comprises a lane; separating means for dividing said lane into a plurality of individual tracks having inlet end portions which are situated nearest to said machine and extend close to and parallel to each other; a distributing arm or chute which is located between said lane and said machine and has an inlet end which is connected to the output of the machine, and an outlet end which is located adjacent to said inlet end portions of said tracks; means for imparting to said arm a reciprocating movement transverse to said tracks for distributing the objects from the machine amongst said tracks; and means for compulsory advancing said objects along said arm and said tracks.

An apparatus of this general kind is disclosed in the U.S. Pat. specification 3,193,078. The object of this apparatus is to facilitate the packing of a predetermined number of bottles, boxes or the like into containers. The apparatus has a distributing arm which is rigid and moves stepwise from one track to another of the feeding lane after each operation through which said predetermined number of objects have been advanced into one of the tracks. The tracks are separated from one another by rails which project above the outlet end of the arm and on account hereof prevent a continuous feeding operation.

Although this apparatus fulfills its intended purpose, it operates very slowly on account of its construction and its stepwise mode of operation.

The field of technology to which the present invention relates is in the first instance the match industry, although the invention by no means is restricted thereto. Thus, the objects concerned are supposed to be match boxes, particularly outer boxes which form the sleeve or outer portion of so called sliding boxes and in which inner boxes or trays are inserted. In the manufacture and filling of match boxes, inner boxes as well as outer boxes, of which at least the latter substantially have been comprised of veneer, have been produced at separate locations and then pneumatically and/or mechanically transported to collecting hoppers, so called "bins" in the past. From these hoppers the respective boxes were fed down onto a number of lanes extending beside each other. Such boxes as occupy an incorrect position on the lanes subsequent to the feeding down operation were manually turned around and placed in correct position on a lane. This requires a considerable amount of work.

The basic concept of the present invention resides therein that complete control should be exercised on the boxes, from their manufacture to the association of the inner boxes with the outer boxes and the filling of the inner boxes, as well as subsequently until they are being packed. The invention relates specifically to that part of the handling of the boxes which follows immediately after their manufacture, and the principal object of the invention is to multiply the speed of operation of an apparatus of the above-mentioned kind. With this object in mind the system or apparatus according to the invention is primarily characterized in that said distributing arm is flexible, is adapted to pendulate substantially continuously, and has its outlet end located on a higher level than that end of the separating means which is located nearest to said distributing arm.

Thanks to its flexibility, the distributing arm always has its inlet and outlet ends directed parallel to the feeding out direction from the machine and to the longitudinal direction of the inlet ends of the tracks respectively. During its continuous oscillating movement the flexible arm becomes bent, on both sides of its central or neutral position, in a more or less strongly curved S-bend which is turned right way round and turned backwards way on respectively on opposite sides of said neutral position.

Thanks to its new features which have been elucidated above the machine according to the invention makes it possible to continuously distribute objects which are manufactured in and fed out from a machine at a rate of about 1,000 objects per minute (i.e. 16 objects/sec.)

Through the continuous distribution of the boxes amongst a plurality of tracks (connected in parallel) also the advantage is gained that the velocity of the boxes which is very high at their ejection from the machine, as is apparent from the above, is reduced to a value at which the inner box more easily can be united with the outer box and the filling of the boxes can be accomplished without complications.

In addition thereto, the distribution of the boxes amongst several tracks brings about the advantage that the buffer store of finished boxes, which is required before the matchmaking machine and its box filler which together form a big and expensive unit and the idle machine time of which should be minimized from the utilization efficiency point of view, is multipled in proportion to the number of tracks for a given length of the buffer store determined by the available space. The number of tracks, amongst which the boxes are distributed by means of the apparatus according to the invention is selected in agreement with the number of parallel rows of inner boxes and outer boxes respectively which are to be combined in pairs and filled with matches in the filling machine.

In the accompanying drawings there is illustrated, diagrammatically and as nonlimiting example, a preferred embodiment of the invention.

FIG. 4 is a plane view of a filing lane which is connected to the distribution board.

FIG. 5 is a partial cross-sectional view, substantially on line V–V in FIG. 4, through the initial portion of the filing lane.

FIG. 8 is a perspective partial view of the outlet end of the distributing arm and the initial portion of the filing lane.

FIG. 9 is a perspective view of the rear portion of the filing lane and means for removing and collecting boxes having occupied an incorrect position on the lane.

FIG. 10 is a detailed view on a larger scale and illustrates some of those switches which are provided between the distribution board and the filing lane.

FIG. 11 is a perspective view of a further set of switches which cooperate with the first-mentioned ones and are located further away on said lane.

FIG. 12 is a simplified electric wiring diagram of the apparatus.

Figure 1:
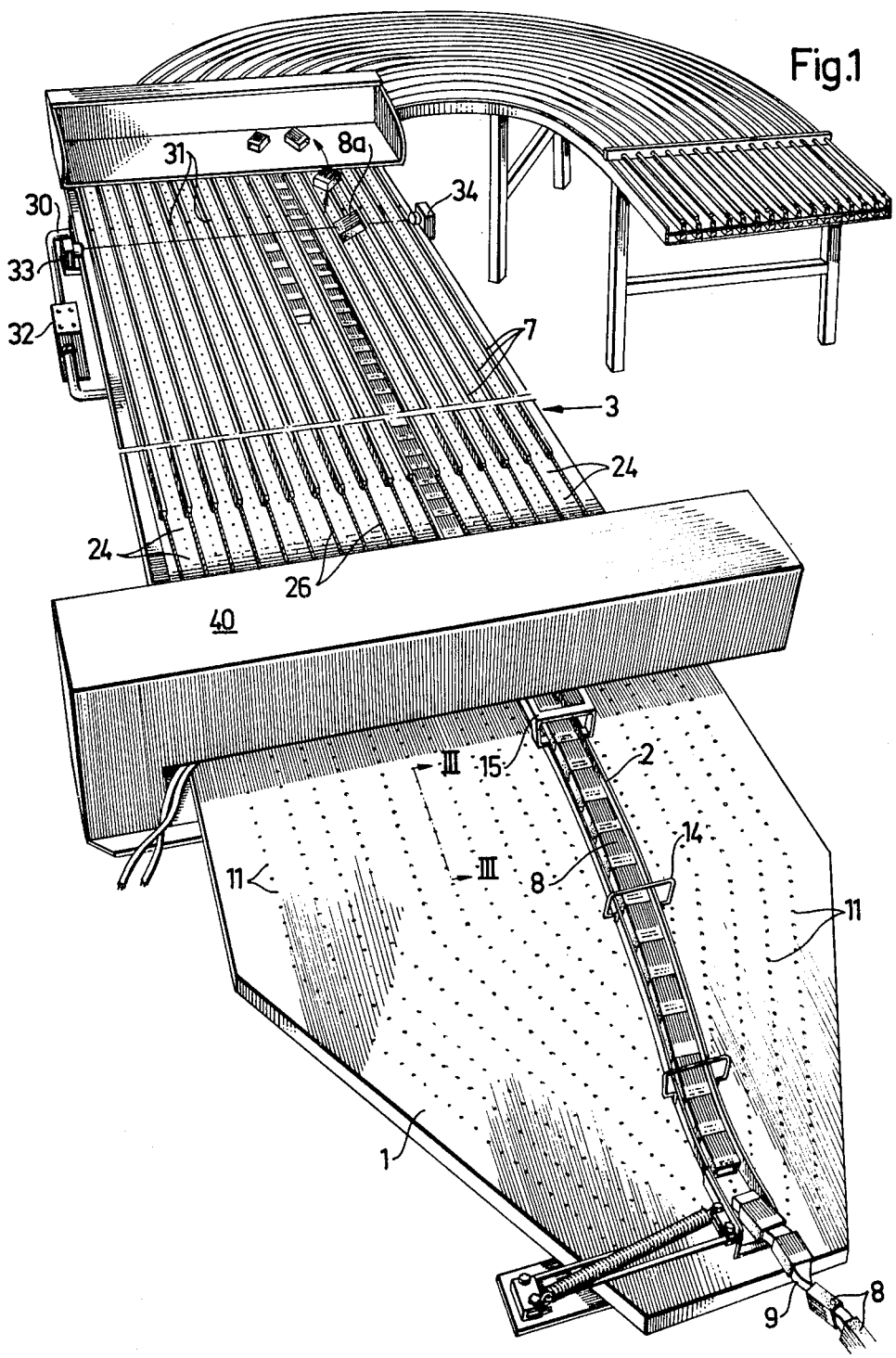
FIG. 1 is a perspective view of the main portion of the apparatus according to the invention.

The principal parts of the apparatus according to the invention are a distribution board 1 with a distributing arm 2 and driving means for the arm, a filing lane 3, a first set of switches 37a, 37b...37p, a second set of switches 38a, 38b...38p which are provided at a rear portion of the filing lane and cooperate with the switches 37, and means, illustrated in FIG. 4 and 9, for the removal of objects (match outer boxes) which occupy an incorrect position on the filing lane 3.

Figure 2:
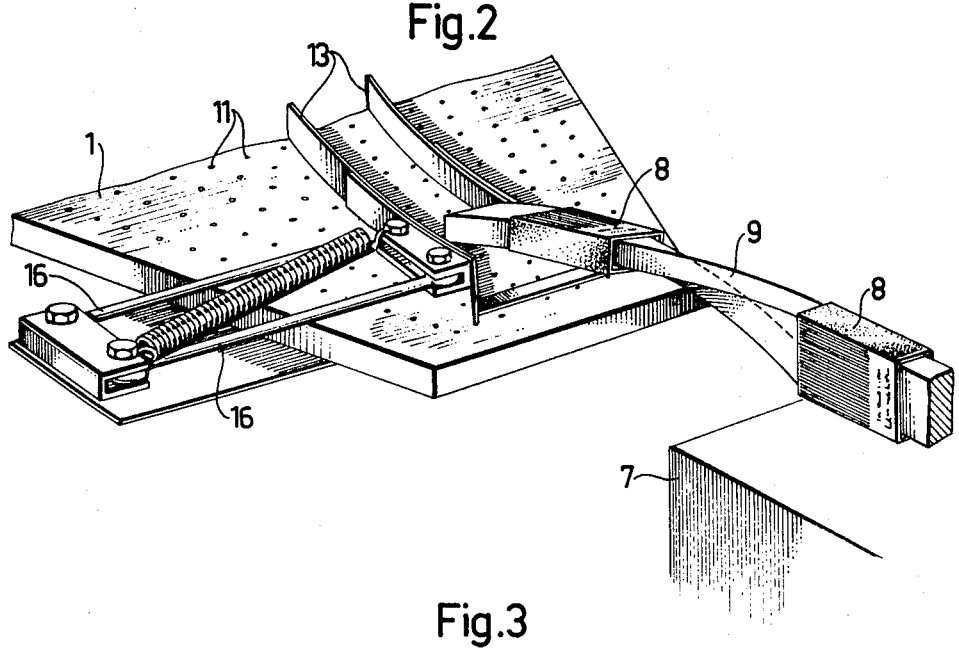
FIG. 2 illustrates the transfer of the match outer boxes to a distributing arm on a distributing board, both of which are comprised in the apparatus.
Figure 7:
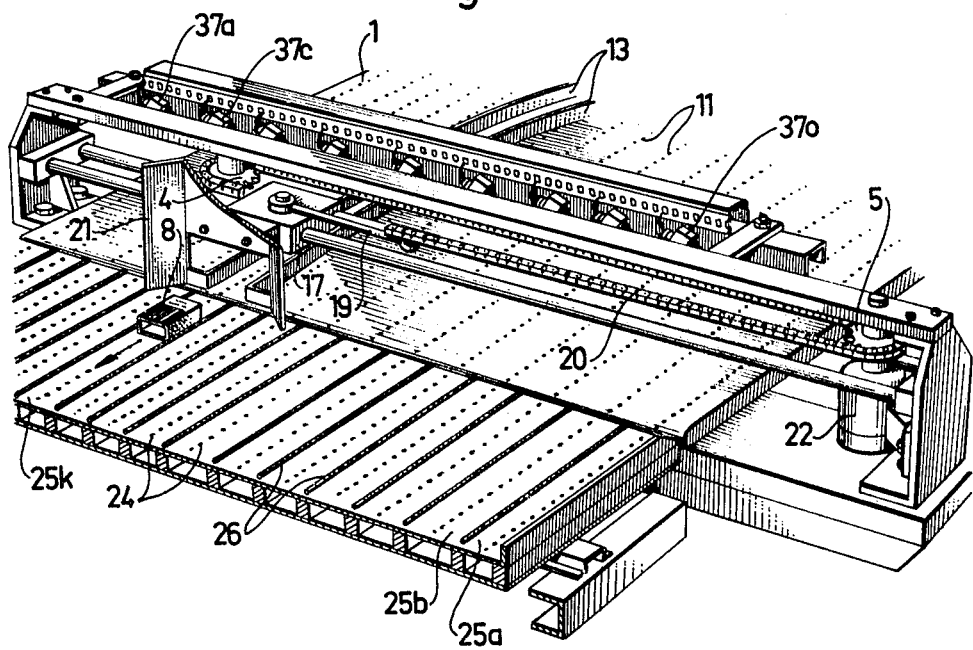
FIG. 7 is a perspective view of part of the driving means of the distributing arm.

In FIGS. 2, 7 designates a machine (merely indicated) in which cardboard blanks are folded and glued to form parallelepipedal match outer boxes 8. In the finished state of the outer boxes two principal faces are vertical, but during the ejection of the boxes from the machine 7 they are rotated 90° on their longitudinal axis by means of a rod 9 which forms a helix comprising a quarter of a revolution (FIG. 2) so that the boxes leave the rod with their two principal faces substantially horizontal. The free end of the rod 9 is located above the distribution board 1 at the inlet end of the distributing arm 2.

Figure 3:
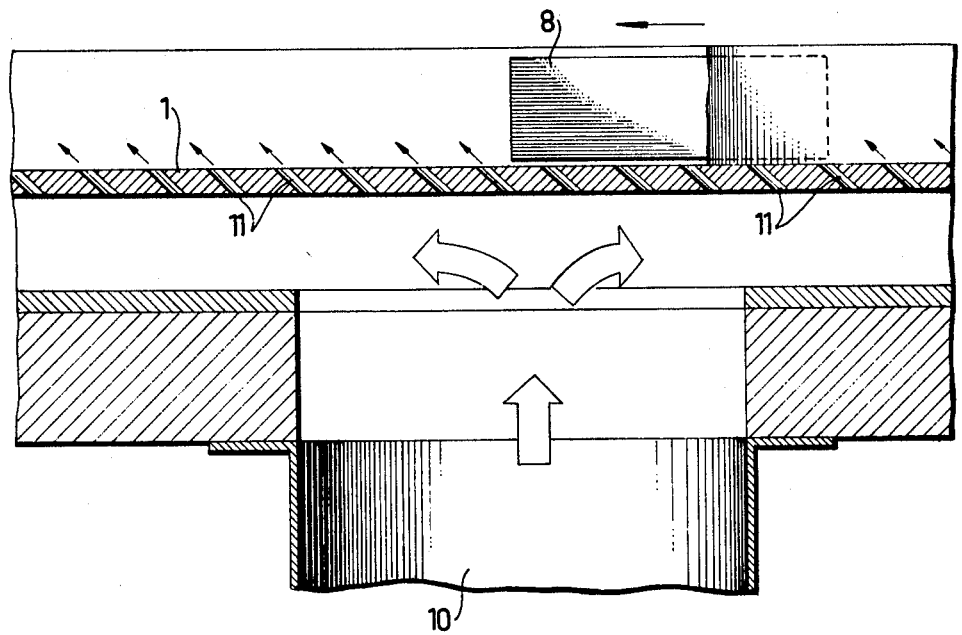
FIG. 3 is a partial sectional view on line III–III through the distribution board.

In plan view the distribution board 1 is substantially parallelotrapezoidal and is, in its end remote from the machine 7, connected directly to the filing lane 3. The distribution board is hollow and is comprised of a supply box for compressed air or compressed fluid and is fed with compressed air through a hose 10 (FIG. 3). As is clearly shown in FIGS. 1—3 the upper wall of the distribution board is perforated. The perforations 11 form an angle of about 35°—45° with said upper wall, as is illustrated in FIG. 3, and have such an inclination that the horizontal velocity component of the compressed fluid flowing out of the perforations is directed substantially towards the filing lane.

The diameter of the perforations 11 is suitably 1.1—1.5 mm.

The distributing arm is comprised of two thin, flexible metal bands 13 which are interconnected by means of clamps or yokes 14, 15 (FIGS. 1 and 10). The end of the distributing arm 2 which faces the box making machine 7 is somewhat widened (FIGS. 1, 2) and surrounds the free end of the rod 9 and is movable substantially in the longitudinal direction thereof by being secured to a pair of parallel links 16. The yoke 15 which could be said to form the free outlet end of the distributing arm 2 which faces the filing lane 3, is provided with an actuating nose 12 and is secured to a slide 17 (FIGS. 7, 10) which is movable along a pair of guides 18. The slide 17 is by means of a link 19 secured to an endless chain 20 which is in its turn driven by a motor 22 through chain wheels 4, 5. Through the structure described the free end of the distributing arm 2 is caused to reciprocate rectilinearly transverse to the filing lane 3. By means of compressed air escaping from the perforations 11 the outer boxes 8 are advanced to the filing lane 3 along the distributing arm 2 while the latter is oscillating back and forth. To prevent the boxes 8 on the filing lane from being disturbed by the jets of compressed air from the perforations 11 when the boxes have left the distributing arm 2 a protective, lee-forming plate 21 is secured to the end of the distributing arm.

Figure 6:
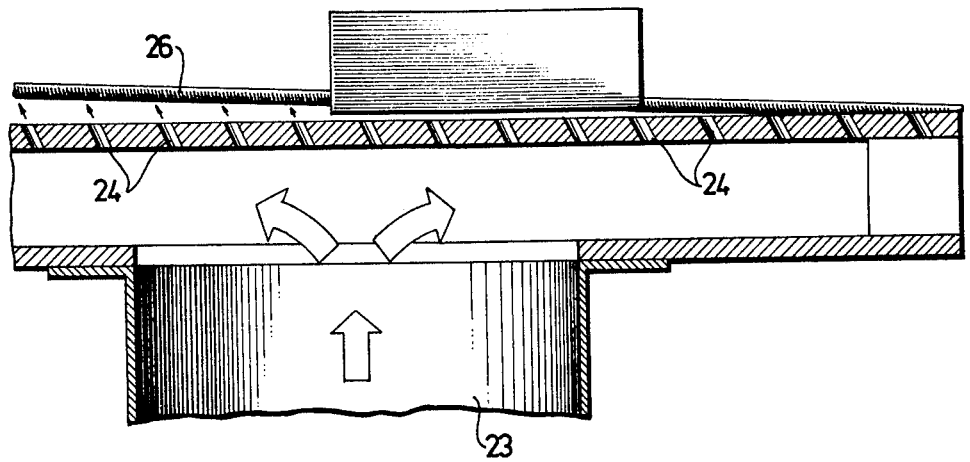
FIG. 6 is a partial, longitudinal sectional view on line VI–VI in FIG. 4 through the filing lane.

Like the distributor board 1 the filing lane 3 is comprised of a casing for compressed fluid, which has a perforated top wall and a plurality of compressed fluid inlets 23 which are spaced along the lane 3 and one of which is illustrated in FIG. 6. The perforations 24 of the filing lane suitably have about the same diameter as the perforations 11, i.e. about 1.3 mm. but they have a different inclination in the longitudinal direction of the lane, i.e. about 15°—25° to a vertical line. The compressed air escaping from the perforations 24 accordingly advances the outer boxes, which are partly supported by the compressed air, along the filing lane 3. This is divided into a plurality (16 in the embodiment disclosed) of tracks 25 which extend adjacent to and parallel to each other, at least in the vicinity of the distributor board 1. The tracks are separated from one another through partial partitions. Those portions of these partitions which are located nearest to the distributor board 1 shall be smooth and preferably also springy or elastic and have a rounded top. Said portions of the partitions are comprised of tightly coiled helical springs for curtains 26 which are so arranged that they have a slight inclination downwards and towards the distributor board 1. Those portions of the partitions between the tracks which follow after the curtain springs 26 are comprised of rails 27 of metal or wood having a rounded top side.

When the distributing arm 2 continuously oscillates back and forth over the distributor board 1, the outer boxes 8 arriving from the box making machine 7 are accordingly divided substantially uniformly amongst the tracks 25. Hereby part of the boxes, of course, will have one of their longitudinal edges resting upon the filing lane 3 in a track 25 at the same time as another portion of the bottom of the same boxes is supported by a curtain spring 26. Due to the fact that the curtain springs 26 are smooth and rounded, these boxes will soon, under the influence of gravity and the jets of compressed fluid from the perforations 24 slide down into one of the two tracks 25 which are separated by the curtain spring in question. It might happen, however, that some boxes, like the box 8a in FIG. 9, land up transversely so that an edge of one of their ends rests upon the bottom of a track at the same time as their other end will rest upon and project above a rail 27. In spite of the fact that these boxes are pushed forwards by succeeding boxes which occupy a correct position in the tracks of the first-mentioned boxes, they will disturb the advancement of the boxes along the lane. One account hereof the apparatus according to the invention has been provided with means, illustrated in FIGS. 4 and 9, for removal of such boxes 8a occupying an incorrect position. These means comprise a source 29 of compressed fluid, a conduit 30 for compressed fluid which extends from the source and has a mouth 31 in each rail 27, a valve 32, e.g. a magnetic valve, which is interconnected in the conduit 30 and can be opened by means of electrical impulses, a light source 33 and a photocell 34 which is normally illuminated by the light source and cooperates therewith. The photocell and the light source are provided on opposite sides of the lane 3 in front of (i.e. nearer the distributor board 1 than) the mouths 31 which are directed obliquely upwards, away from the distributor board 1. When the boxes 8a are being advanced by succeeding boxes, those portions of the boxes 8a which project above the rails 27 will interrupt the light beam which is directed towards the photocell 34 from the lamp 33. On account hereof the magnetic valve 32 will receive an opening impulse and admits a blow of compressed air which blows away such boxes 8a as occupy an incorrect position to a collecting hopper 35.

By means of the device described above the boxes will be substantially uniformly distributed amongst the different tracks 25a...25p of the lane. On account of accidental disturbances or for other reasons it might happen, however, that a shortage of boxes will appear in one or several tracks in relation to the others. To eliminate this drawback the apparatus according to the invention has been provided with means by which the length of the files of boxes in the different tracks will be automatically equalized.

In these means the first-mentioned set of switches 37a, 37b...37 (FIGS. 7 and 10) and the second set of switches 38a, 38b...38 (FIG. 11) cooperating therewith, as well as a manually actuatable switch 39 and some other components are comprised. The first set of switches are actuated purely mechanically, and these switches are provided under a casing 40 which is illustrated in FIGS. 1 and 8 but has been removed in FIGS. 7 and 10. Each one of the switches 37a, 37b...37p is allotted to one individual one of the tracks 25a, 25b...25p and is actuated (opened) by means nose 12, which is attached to the foremost yoke of the distributing arm, every time the distributing arm is right in front of the track to which the switch in question is allotted. The other set of switches 38a, 38b...38p is arranged further on along the lane (behind the bend in FIG. 1 which is introduced for space reasons) and also comprises one switch per track 25. The switches 38 which are arranged immediately above their respective tracks are adapted to be actuated by a compressed fluid and are so designed that they are closed when the outflow of compressed fluid (air) is prevented by boxes which have a position in the track just under the respective switches, and are open when the outflow of compressed fluid is freed by the absence of such boxes 8 in the track 25 to which the respective switch 38 is allotted.

The electric circuit diagram of the apparatus in which the switches 37—39 are comprised is shown in FIG. 12. In this FIG. R, S, T designate the three phases of an electric three-phase system having a zero conductor (0). The motor 22 which is also shown in FIG. 7 has a main switch 41, three fuses 42, a contactor 43 and an overload protector 44. Between the phase R and the zero conductor the primary winding of a transformer 45 is interconnected, the secondary winding of which is connected in series with a fuse 46 and a control switch 47. The above-mentioned manual switch 39 is connected over the secondary winding in series with the contactor 43, the overload protector 44 and a switch 49 which is illustrated in a position corresponding to automatical operation but also has a position for purely manual control of the apparatus. In FIG. 12 we also find the mechanically actuatable switches 37a, 37b...37p which are mutually connected in series, and compressed fluid actuatable switches 38a, 38b...38p. Each of the last-mentioned switches is connected in series with the winding of a corresponding relay 50a, 50b...50p which are mutually connected in parallel. Each relay has two make contacts 50a', 50a''; 50b', 50b''...50p', 50p'' and a break contact 50a''', 50b'''...50p'''. Each relay contact corresponding mechanically actuatable switch 37a, 37b...37p. The relay contacts 50a'', 50b''...50p'' are mutually connected in series as are the relay contacts 50a''', 50b'''...50p'''. The two last-mentioned ones of the series circuits 7 thus formed are mutually connected in parallel and are together connected in series with the winding of a relay 51 over the secondary winding of the transformer 45. The relay 51 has a make contact 51' and a break contact 51''. The make contact 51' is connected in series with the winding of a timing relay 52, the make contact 52' of which has a delayed closing operation. The delay of the closing of the timing relay 52 is adjustable and of the order of 1—3 (normally about 1.5) seconds.

All switches 37 of FIG. 12 are illustrated in their inactuated (closed) position as are the switches 37a and 37c in FIG. 10. All switches 38 of FIG. 12 are illustrated in the position corresponding to the empty tracks 25a—25l of FIG. 11 in which the pressure fluid can escape without being impeded by a box 8 located in the track below the switch in question. In the following discussion it is initially presumed that the different means occupy the position illustrated in FIG. 12. The motor 22 is then running and drives the distributing arm 2 back and forth through the chain wheels 4, 5, the chain 20 and the slide 17, since the winding of the contactor 43 receives current through the inactuated switches 37a, 37b...37p as well as through the relay contact 51'. The latter is closed if all of the pressure fluid operated switches 38a, 38b...38p occupy the same position, i.e. are either closed or opened.

It will now be assumed that the distributing arm 2 has left the track 25a, which is full and is on its way to the track 25b, which is empty, i.e. contains no boxes under the switch 38b. Under these conditions the switch 38a is closed and the switch 38b is open. The contacts 50a', 50a'' and 50b''' are accordingly closed, while the contacts 50b', 50b'' and 50a''' are open. The circuit through the relay 51 is accordingly open so that the contact 51' makes ready the circuit through the timing relay 52, and the contact 51'' is open. The motor 22, however, receives current until the distributing arm 2 arrives to the track 25b and the nose 12 of the yoke 15 actuates the switch 37b so that the series circuit through the switch 37 is interrupted. Then, the motor 22 stops as does the distributing arm 2 which delivers boxes into the insufficiently fed track 25b during the time interval, e.g. 1.5 seconds while the delay of the timing relay lasts. After this delay the contact 52' closes the circuit to the contactor 53 of the motor again so that the motor starts anew.

To elucidate the operation of the apparatus further it will be assumed that the nose 12 of the yoke 15 of the distributing arm 2 has just operated the switch 37b so that the latter has interrupted the series circuit through the switches 37a...37p to the contactor 43, and that the track 25b is full in contradistinction to one or more of the remaining tracks 25 so that the relay 51 is not energized. In spite of the fact that the contact 51' is then open, the motor 22 runs (as it shall do), since the contact 37b is now bridged by the closed contact 50b'.

If one of the tracks in relation to the others should have a shortage of boxes which is greater than that corresponding to the closing delay of the contact 52', the operator supervising the box making machine may momentarily arrest the distributing arm 2 just in front of the unfed track so that it is fed with a suitable number of boxes, by opening the switch 39 (see also FIG. 11).

The apparatus described above and illustrated in the drawings is, of course, merely to be regarded as a nonlimiting example and may as to its details be modified in several ways within the scope of the following claims. In particular, the apparatus may also be utilized for distribution of other objects than match boxes.

I claim:

1. In a system for distributing and advancing objects, which is connected e.g. to a machine for manufacturing and ejecting said objects and comprises a lane; separating means comprising guide rails for dividing said lane into a plurality of individual tracks having inlet end portions which are situated nearest to said machine and extend close to and parallel to each other, a flexible distributing chute which is located between said lane and said machine and has a fixed inlet end which is connected to the output of the machine, and an outlet end which is located adjacent to said inlet end portions of said tracks; means for imparting to the outlet of chute a reciprocating movement transverse to said tracks for distributing the objects from the machine amongst said tracks; and means for compulsory advancing said objects along said chute and said tracks, the improvement which comprises that said distributing chute, which is flexible, is oscillated substantially continuously by said movement imparting means, and has the bottom of its outlet end located on a higher level than and directly above the guide rails of the separating means.

2. The system according to claim 1, characterized by the provision of a perforated base which forms a support for the distributing chute and comprises a box for supply of compressed fluid and the perforations of which are arranged in rows, which diverge in a fanlike manner from the inlet end of the distributing chute, said perforations having such a direction that the fluid emerging in the form of jets from said perforations advances said objects towards said lane, and at least one further similar box for the supply of compressed fluid and having a perforated top wall which constitutes the bottom of said tracks and the perforations of which are arranged in rows, one row being provided in and extending along the bottom of each track, said perforations having such a direction that the compressed fluid emerging from said further box advances said objects along said tracks.

3. The system according to claim 2, characterized by the provision of means for temporarily arresting said distributing chute during its normal continuous movement in front of a track which has an incidental shortage of objects in relation to other tracks.

4. The system according to claim 3, characterized in that said arresting means comprise a plurality of switches equal in number to the number of tracks and each allotted to an individual track, said switches being sequentially actuable by the outlet end of said distributing chute when said outlet end passes the respective tracks, an equal plurality of pressure fluid sensitive means each associated with a respective one of said switches and located directly opposite to a respective one of said tracks at a distance from said distributing chute, each of said pressure sensitive means cooperating with its associated switch to temporarily arrest the drive motor of said distributing chute, when the time interval between two successive strength alterations, caused by the passage of an object past the pressure sensitive means of a track, of the impacts on the fluid pressure sensitive means of the respective tracks of the jets from the perforations of the respective tracks, exceeds a predetermined value.

5. The system according to claim 1, characterized in that said separating means are comprised of resilient members which are located nearer to the respective bottoms of adjacent tracks than to adjacent resilient members for supporting in cooperation with the bottom of an adjacent track such objects as are delivered in misalignment with a track during the initial portion of their advancement along said track, said resilient members having smooth upper sides for facilitating the complete sliding down of said objects into said tracks.

6. The system according to claim 5, characterized in that said resilient members are tightly coiled, helical springs for curtains.

7. The system according to claim 1, characterized in that said means for reciprocating said distributing chute are comprised of a motor, a pair of chain wheels, one of which is driven by said motor, and an endless chain, continuously running over said chain wheels and extending substantially perpendicular to the inlet portions of said tracks, the outlet end of said distributing chute being articulated to said chain by means of a link.

8. The system according to claim 1, characterized by the provision of means for automatic removal of incorrectly positioned objects projecting out of their respective tracks, said automatic removing means comprising a source of compressed fluid, a compressed fluid duct which leads from said source and has one mouth in each track, valve means interconnected in said duct, and electric control means for opening said valve means in response to an object's occupying of an incorrect position to direct, through said opening of said valve, a jet of compressed air against said incorrectly positioned object for blowing it away into a collecting hopper.

9. The system according to claim 8, characterized in that said control means comprise a photocell and a light source directed towards said photocell, which are so arranged on mutually opposite sides of said lane, that an object which during its advancement along said lane occupies said incorrect position with respect to its track interrupts the light beam from the light source to the photocell for actuating said valve means to blow away said incorrectly positioned object.